United States Patent Office 2,968,668
Patented Jan. 17, 1961

2,968,668

ORGANIC COMPOUNDS CONTAINING PHOSPHORUS AND SULPHUR

Henry Tolkmith, Midland, Mich., assignor to The Dow Chemical Company, Midland, Mich., a corporation of Delaware No Drawing. Filed Oct. 27, 1958, Ser. No. 769,581

10 Claims. (Cl. 260—461)

This invention relates to organic compounds containing phosphorus and sulphur, and is more particularly concerned with 1,2-bis(phosphinothioyl)hydrazines and a method for their preparation.

The compounds of this invention have the formula:

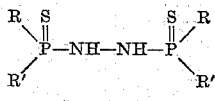

(Formula I)

wherein R and R' may be radicals containing up to 4 carbon atoms which are lower alkoxy, mono-lower alkylamino radicals, or di-lower alkylamino radicals wherein each of the alkyl groups will contain up to 4 carbon atoms. R and R' thus may be the same or different alkoxy radicals, the same or different monoalkylamino radicals, or the same or different dialkylamino radicals. Further compounds are included where R may be alkoxy and R' is monoalkylamino or dialkylamino radicals. Similarly, R may be a monoalkylamino radical, while R' is a dialkylamino group.

The compounds of the present invention are colorless crystalline solids somewhat soluble in many organic compounds. They have been found to be active plant growth control materials and are adapted to be employed as active toxic constituents in dust and liquid compositions for the control of the growth, the killing of weeds and for the plant growth sterilization of soil. The compounds are also useful as systemic insecticide.

The new compounds may be readily prepared by reacting together (1) hydrazine and (2) a phosphinothioyl halide having the formula:

wherein R and R' have the values previously assigned and X is a halogen having an atomic number between 8 and 54. Thus, the halogen may be fluorine, chlorine, bromine or iodine, although chlorine is preferred. A smooth reaction takes place in a temperature range of 0° to 50° C. with the production of the desired di-substituted hydrazine. A 2 molar excess of hydrazine preferably is employed to act as a hydrogen halide acceptor, thus resulting in higher yields. Alternatively, other hydrogen halide acceptors such as, for example, trimethylamine, triethylamine, tripropylamine and trialkylamine in general may be used.

In carrying out the reaction, a solution of a phosphinothioyl halide in a solvent which is substantially non-reactive under the conditions of the reaction is provided. Some suitable solvents for the practice of this invention are, for example, benzene, toluene, xylene, chloroform, carbon tetrachloride, diethyl ether, dipropyl ether and petroleum ether, the boiling point of the solvent should be above the temperature of the reaction, yet kept low in order to facilitate removal when the reaction has been completed. Hydrazine is added slowly and a temperature of 0°–50° C., desirably 10° to 40° C., and preferably 20° to 30° C., is maintained for the duration of the reaction. After addition of hydrazine has been completed, the reaction mixture is filtered to remove insoluble materials. Upon evaporation of the filtrate, the desired product appears as white crystals which may be further purified, if desired, by recrystallization from appropriate solvents.

The following examples illustrate the invention but are not to be construed as limiting.

EXAMPLE I

*1,2-bis(dimethoxyphosphinothioyl)hydrazine*

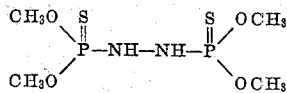

An agitated solution of 2.06 moles of dimethoxyphosphinothioyl chloride in 1.2 liters of benzene was maintained at 20° to 30° C. for a period of 24 hours during which time 3.1 moles of hydrazine were added dropwise. The reaction mixture was filtered, the filtrate evaporated, this residue extracted with 500 milliliters of ether and the extract again evaporated to remove the ether. The residue was recrystallized from the cyclohexane and there was thus obtained a yield of 63 grams of white crystalline 1,2-bis(dimethoxyphosphinothioyl)-hydrazine, melting over the range 66° to 68° C.

| Analysis | Molecular Weight | Percent Nitrogen | Percent Sulphur |
|---|---|---|---|
| Calculated | 280.25 | 10.0 | 22.89 |
| Found | 282.271 | 9.85 | 22.70 |

EXAMPLE II

*1,2-bis(diethoxyphosphinothioyl)hydrazine*

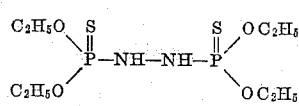

An agitated solution of diethoxyphosphinothioyl chloride (0.66 mole) in 500 milliliters of benzene was held at 20° to 30° C. for a period of 10 hours and during this time one mole of hydrazine was added dropwise. The reaction mixture was filtered, the filtrate evaporated leaving a semi-solid residue which on filtration gave 30 grams of a white crystalline 1,2-bis(diethoxyphosphinothioyl)-hydrazine, melting at 82° C.

| Analysis | Molecular Weight | Percent Nitrogen | Percent Sulphur |
|---|---|---|---|
| Calculated | 336.36 | 8.33 | 19.07 |
| Found | 324 | 8.64 | 19.52 |

EXAMPLE III

*1,2-bis[bis(dimethylamino)phosphinothioyl]hydrazine*

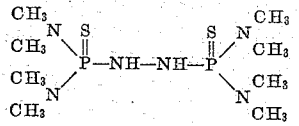

An agitated solution of 66 grams (1 mole) of bis(dimethylamino)phosphinothioyl chloride in 600 milliliters of benzene was held at 20° to 30° C. for a period of 5 hours, and during this time 100 grams (1 mole) of hydrazine hydrate were added dropwise. On completion of this addition, the reaction mixture was heated to 75° C.

and maintained at this temperature for one hour. Upon removal from the reaction vessel, the reaction mixture was filtered and the filtrate washed with 500 milliliters of water, and the non-aqueous portion evaporated. To the residue from the evaporation, 500 milliliters of cyclohexane were added. By this method, 46 grams of white crystalline 1,2-bis[bis(dimethylamino)phosphinothioyl]-hydrazine, melting over the range 89°–91° C. were obtained.

| Analysis | Molecular Weight | Percent Nitrogen |
|---|---|---|
| Calculated | 332.42 | 25.28 |
| Found | 325 | 25.41 |

EXAMPLE IV

*1,2 - bis(methoxymethylaminophosphinothioyl)hydrazine*

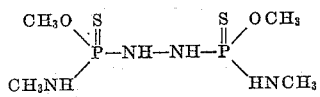

An agitated solution of 80 grams (0.5 mole) of methoxymethylaminophosphinothioyl chloride in 500 milliliters of benzene was held at 20 to 30° C. for a period of 20 hours and during this time, 26 grams (0.75 mole) of anhydrous hydrazine were added dropwise. After separation of the unreacted hydrazine layer, the remaining benzene solution was evaporated, the residue from this evaporation was diluted with 500 milliliters of cyclohexane and the hexane evaporated. The semi-solid residue from the cyclohexane evaporation was extracted with water and the water insoluble fraction was recrystallized from cyclohexane. There was thus obtained 7 grams of 1,2 - bis(methoxymethylaminophosphinothioyl)hydrazine, melting over the range of 99° to 100° C.

Analysis: Molecular weight
  Calculated _____ 278.28
  Found _____ 260

While the phosphinothioyl halide has been generally shown as a chloride, it is to be understood that phosphinothioyl fluorides, bromides and iodides may be employed similarly.

In a manner similar to that of the foregoing examples, other phosphinothioyl hydrazines may be prepared from suitable phosphinothioyl halides, of which the following hydrazines are representative: 1,2-bis(dipropoxyphosphinothioyl)hydrazine; 1,2 - bis(dibutoxyphosphinothioyl)hydrazine; 1,2 - bis(methoxyethylaminophosphinothioyl)hydrazine; 1,2 - bis(methoxypropylaminophosphinothioyl) hydrazine; 1,2 - bis(methoxybutylaminophosphinothioyl)hydrazine; 1,2 - bis(ethoxymethylaminophosphinothioyl)hydrazine; 1,2 - bis(ethoxyethylaminophosphinothioyl)hydrazine; 1,2 - bis(ethoxypropylaminophosphinothioyl)hydrazine; 1,2 - bis(ethoxybutylaminophosphinothioyl)hydrazine; 1,2-bis(propoxymethylaminophosphinothioyl)hydrazine; 1,2 - bis(propoxyethylaminophosphinothioyl)hydrazine; 1,2-bis(propoxypropylaminophosphinothioyl)hydrazine; 1,2 - bis(propoxybutylaminophosphinothioyl)hydrazine; 1,2-bis(butoxymethylaminophosphinothioyl)hydrazine; 1,2 - bis(butoxyethylaminophosphinothioyl)hydrazine; 1,2 - bis(butoxypropylaminophosphinothioyl)hydrazine; 1,2 - bis(butoxybutylaminophosphinothioyl)hydrazine; 1,2 - bis[bis(diethylamino)-phosphinothioyl]hydrazine; 1,2 - bis[bis(dipropylamino)-phosphinothioyl]hydrazine; 1,2 - bis[bis(dibutylamino)-phosphinothioyl]hydrazine.

The bis(phosphinoethioyl)hydrazines of the present invention are effective as herbicides for killing of weeds and the plant growth sterilization of soil. They are also valuable as parasiticides and are adapted to be employed for the control of insect and fungal organisms. For such use, the products may be dispersed on an inert finely divided solid and employed as dusts. Such mixtures may also be dispersed in water with and without the aid of a wetting agent and the resulting aqueous suspensions employed as sprays. In other procedures, the products may be employed as active toxic constituents in oil in water emulsions or aqueous dispersions with or without the addition of wetting, dispersing or emulsifying agents. The resulting mixtures may be employed to directly contact the organism to accomplish control thereof.

In a representative operation 1,2-bis(dimethoxyphosphinothioyl)hydrazine is dispersed in water at a concentration of one-half pound per hundred gallons of water. This mixture is used to wet one-half of a representative group of tomato plants. After the dispersion has dried on the tomato plants, they are infected with an aqueous dispersion of spores of *Alternaria solani*. The plants are held under optimum conditions for development of the fungus, which is 71° F. and 100 percent relative humidity. At the end of 12 days, the treated plants were healthy while the untreated plants were diseased. The 1,2-bis-(diethoxyphopshinothioyl)hydrazine when dispersed at a concentration of 0.20 gram per 100 grams of water and this dispersion employed to wet cranberry bean plants which are then dried, i.e. no visible surface water, and infected with Mexican bean beetles. This procedure results in a commercial kill of the beetles. 1,2-bis[bis(dimethylamino)phosphinothioyl]hydrazine when dispersed in water and applied at the rate of 50 pounds per acre to freshly planted Japanese millet prevents the growth thereof. 1,2 - bis(methoxymethylaminophosphinothioyl)-hydrazine when administered orally to white mice as a 5 percent solution in acetone at a dosage level of 500 milligrams per kilogram is an effective systemic insecticide. Stable flies feeding on a mouse treated with 1,2-bis(methoxymethylaminophosphinothioyl)hydrazine one to two hours prior to such feeding, die.

Various modifications may be made in the present invention without departing from the spirit or scope thereof, and it is to be understood that I limit myself only as defined in the appended claims.

I claim:

1. 1,2-bis(dialkoxyphosphinothioyl)hydrazines having the formula:

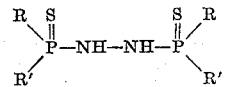

wherein R is a lower alkoxy radical and R' is a lower alkoxy radical.

2. 1,2 - bis(alkoxyalkylaminophosphinothioyl)hydrazines having the formula:

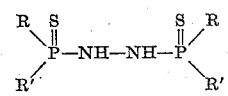

wherein R is a lower alkoxy radical and R' is a mono-lower alkylamino radical.

3. 1,2 - bis(alkoxydialkylaminophosphinothioyl)hydrazines having the formula:

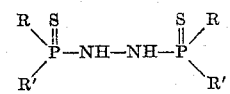

wherein R is a lower alkoxy radical and R' is a di-lower alkylamino radical.

4. 1,2-bis(dimethoxyphosphinothioyl)hydrazine having the formula:

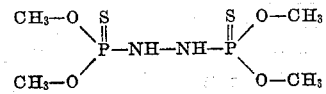

5. 1,2-bis(diethoxyphosphinothioyl)hydrazine having the formula:

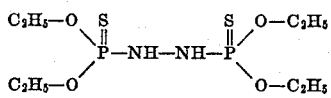

6. 1,2-bis(methoxymethylaminophosphinothioyl)hydrazine having the formula:

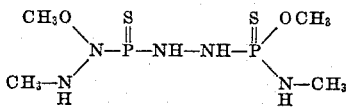

7. A method for the preparation of 1,2-bis(phosphinothioyl)hydrazines having the formula:

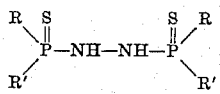

wherein R and R' are individually selected from the group consisting of lower alkoxy, mono-lower alkylamino and di-lower alkylamino radicals, the steps of which comprise providing a solution of di-substituted phosphinothioyl halide having the formula:

wherein R and R' have the values hereinbefore assigned, and X is a halogen having an atomic number between 8 and 54, in a solvent which is essentially non-reactive under the conditions of the reaction, adding about a two molar excess of hydrazine while maintaining the temperature of the reaction mixture between 0 and 50° C., and recovering therefrom 1,2-bis(phosphinothioyl)hydrazine.

8. A method for the preparation of 1,2-bis(dialkyloxyphosphinothioyl)hydrazines having the formula:

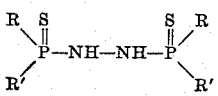

wherein R and R' are lower alkoxy radicals, the steps of which comprise providing a solution of a dialkoxythiophosphonyl halide having the formula:

wherein R and R' are lower alkoxy radicals and X is a halogen having an atomic number between 8 and 54, in a solvent which is essentially non-reactive under the conditions of the reaction, adding about a two molar excess of hydrazine while maintaining the temperature of the reaction mixture between 0 and 50° C. and recovering therefrom 1,2-bis(dialkoxyphosphinothioyl)hydrazine.

9. A method for the preparation of 1,2-bis(alkoxyalkylaminophosphinothioyl)hydrazines having the formula:

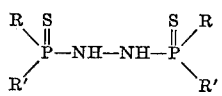

wherein R is a lower alkoxy radical and R' is a mono-lower alkylamino radical, the steps of which comprise providing a solution of an alkoxyaminophosphinohalide having the formula:

wherein R is a lower alkoxy radical and R' is a mono-lower alkylamino radical, and X is a halogen having an atomic number between 8 and 54, in a solvent which is essentially non-reactive under the conditions of the reaction, adding hydrazine while maintaining the temperature of the reaction mixture between 0 and 50° C. and recovering therefrom 1,2-bis(alkoxyalkylaminophosphinothioyl)hydrazine.

10. A method for the preparation of 1,2-bis(alkoxydialkylaminophosphinothioyl)hydrazines having the formula:

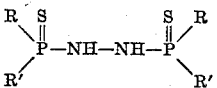

wherein R is a lower alkoxy radical and R' is a di-lower alkylamino radical, the steps of which comprise providing a solution of an alkoxydialkylaminophosphinothioyl halide having the formula:

wherein R is a lower alkoxy radical, R' is a di-lower alkylamino radical, and X is a halogen having an atomic number between 8 and 54, in a solvent which is essentially non-reactive under the conditions of the reaction, adding hydrazine while maintaining the temperature of the reaction mixture between 0 and 50° C. and recovering therefrom 1,2-bis(alkoxydialkylaminophosphinothioyl)hydrazine.

References Cited in the file of this patent

UNITED STATES PATENTS

| | | |
|---|---|---|
| 2,382,309 | Hamilton | Aug. 14, 1945 |
| 2,655,533 | Lewis | Oct. 13, 1953 |
| 2,759,961 | Fitch | Aug. 21, 1956 |

OTHER REFERENCES

Melnikov et al.: J. Gen. Chem. U.S.S.R. 25, 793–795 (1955).